(12) United States Patent  
Natanzon et al.

(10) Patent No.: US 9,917,854 B2
(45) Date of Patent: Mar. 13, 2018

(54) SECURITY DETECTION

(71) Applicant: EMC Corporation, Hopkinton, MA (US)

(72) Inventors: Assaf Natanzon, Tel Aviv (IL); Philip Derbeko, Modin (IL)

(73) Assignee: EMC Corporation, Hopkinton, MA (US)

( * ) Notice: Subject to any disclaimer, the term of this patent is extended or adjusted under 35 U.S.C. 154(b) by 40 days.

(21) Appl. No.: 14/870,135

(22) Filed: Sep. 30, 2015

(65) Prior Publication Data

US 2017/0093890 A1   Mar. 30, 2017

(51) Int. Cl.
G06F 7/04 (2006.01)
H04L 29/06 (2006.01)
G06F 11/14 (2006.01)
G06F 17/30 (2006.01)

(52) U.S. Cl.
CPC ...... H04L 63/1416 (2013.01); G06F 11/1458 (2013.01); G06F 17/30575 (2013.01); G06F 2201/84 (2013.01)

(58) Field of Classification Search
CPC .................................................. H04L 63/1416
USPC ............................................................ 726/3
See application file for complete search history.

(56) References Cited

U.S. PATENT DOCUMENTS

| 7,447,850 B1* | 11/2008 | Del Rosso | G06F 11/1448 |
| | | | 711/156 |
| 2004/0139128 A1* | 7/2004 | Becker | G06F 11/1456 |
| 2005/0289187 A1* | 12/2005 | Wong | G06F 21/554 |
| 2010/0303240 A1* | 12/2010 | Beachem | G06F 21/57 |
| | | | 380/277 |

* cited by examiner

Primary Examiner — Christopher Brown
(74) Attorney, Agent, or Firm — Krishnendu Gupta; Robert Kevin Perkins

(57) ABSTRACT

A computer implemented method, computer program product and comprising rolling an image to a point in time in a protection window by applying write data using write metadata and examining read metadata, the write data, and the write metadata to determine if the image was accessed by an intruder.

20 Claims, 13 Drawing Sheets

SECURITY DETECTION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A computer implemented method, computer program product and comprising rolling an image to a point in time in a protection window by applying write data using write metadata and examining read metadata, the write data, and the write metadata to determine if the image was accessed by an intruder.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
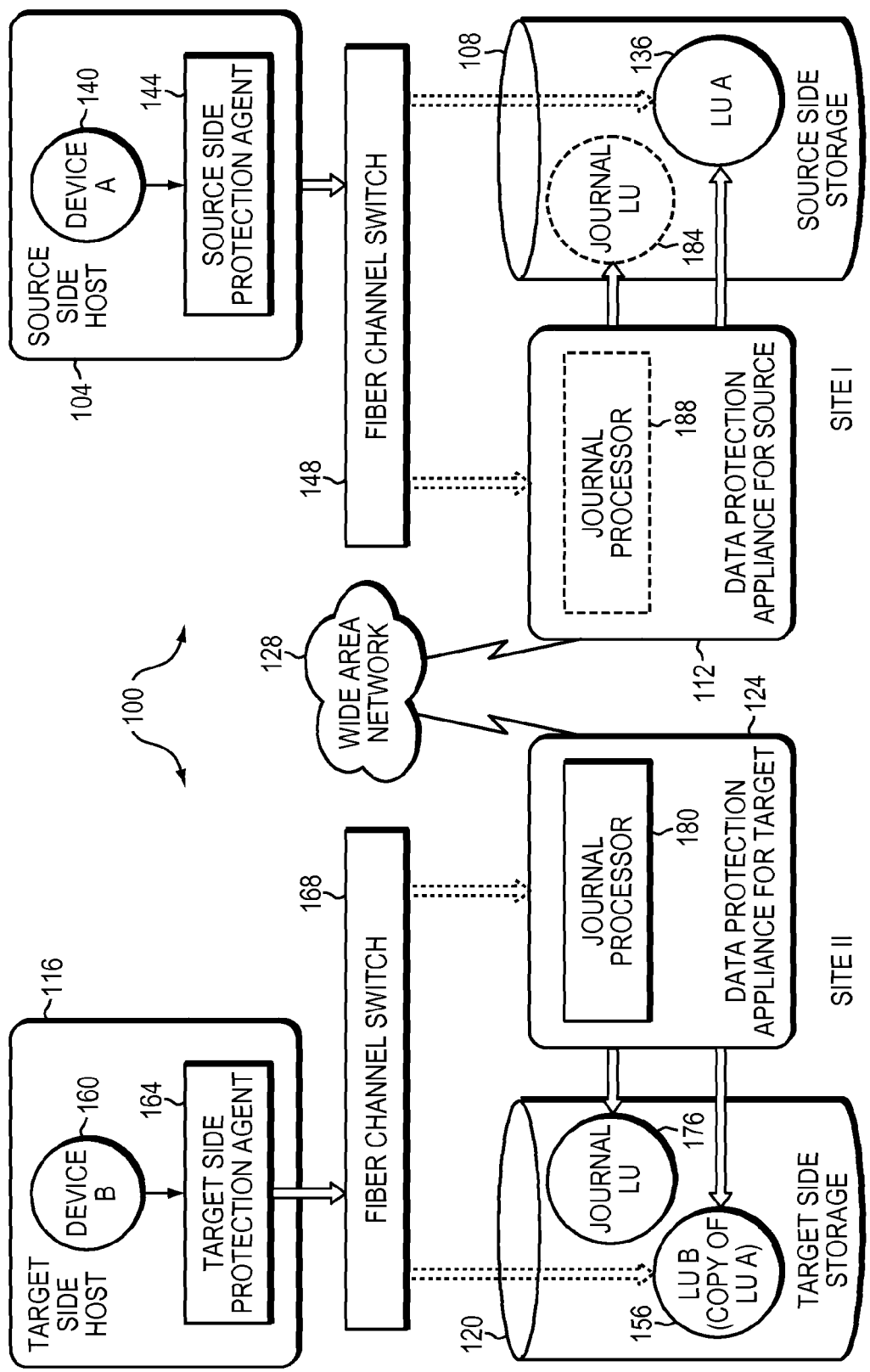
FIG. 1 is a simplified illustration of a data protection system, in accordance with an embodiment of the present disclosure.

Typically during an advanced persistent threat (APT), an attacker reads data to be stolen, encrypts it and then sends it over a WAN. Generally, since the sent data is encrypted, it can be very hard to know which files were stolen. In certain embodiments, the current disclosure may enable detection of which files were accessed at the time of theft and may allow detection of what was stolen. In other embodiments, a notification of unauthorized access at a point in time may enable a replication image to be rolled to that point in time. In many embodiments, read metadata and write data may be kept for points in time in a protection window enabling read and write access to be examined for points in time within that protection window. In many embodiments, a protection window may correspond to a period of time for which a log or journal corresponding to read and write access to a LVN, group of LVNs, or consistency group is kept. In many embodiments, read and write activity may include command data and commands.

In some embodiments, a splitter may be configured to send metadata of read commands arriving to a LU to a journal. In many embodiments, a journal may store read metadata in addition to write IO data. In certain embodiments, command may also be stored in a journal. In most embodiments, it may be possible to detect both read activity to a disk and write activity to a disk at any point in time during a replication window.

In certain embodiments, using traces from read metadata and write data, a system may be able to look at a point in time. In many embodiments, it may be possible to roll to a point in time of interest. In most embodiments, it may be possible to parse a file system and detect which files were accessed, either read and/or written to, at the point of time. In an embodiment, it may be able to detect which files where created during the period of time. In certain embodiments, it may be able to determine what files were accessed at that point in time. In many embodiments, it may be possible to detect if an encrypted file was created and to what file or files encrypted file corresponds. In some embodiments, this may be possible as a journal may contain the data of writes and metadata corresponding to reads. In most embodiments, this may enable automatic detection of which files may have been stolen during an APT.

In some embodiments, splitting of read metadata and write data may be performed at a storage level and the APT itself may not be able to hide the accesses and may not be able to detect that the APT is being monitored. In other embodiments, a splitter may be located in a hypervisor. In a further embodiment, a splitter may be located in a virtual machine. En most embodiments, command data, in addition to read metadata and write data may be captured.

In most embodiments, a splitter resident outside of a hypervisor may split IO written by the hypervisor at the storage layer to a replication appliance. In certain embodiments, a splitter may send information about read IOs by the hypervisor to a data protection appliance. In many embodiments, a splitter stored in a storage layer may split metadata information about read IO. In other embodiments, a splitter stored in a hypervisor may split metadata about read IO.

In further embodiments, by recording read metadata about IOs, it may be understood what files were accessed by which machines, physical or virtual. In many embodiments, recording metadata about read IOs may enable a recreation of every activity performed by a machine, physical or virtual. In many embodiments, in conjunction with write activity, a full picture of the actions of a machine may be created. In some embodiments, if a splitter is located in the storage layer, a machine, both physical or virtual, may have no way to detect that its read and write IOs are being recoded. In other embodiments, if the splitter is placed in a VM, the virtual machine may be able to detect that IOs are being tracked by a splitter. In some embodiments, reading particular files or sets of files may indicate suspicious activity.

According to a study done by Scott & Scott LLP of over 700 businesses, 85% of respondents confirmed they had been the victims of a security breach. In many embodiments, a challenge for security with virtual machines may be that in virtual machine environments, virtual machines appear and disappear. In many embodiments, this may lead to dangerous security issues. In some embodiments, a threat from a virtual machine may be from an internal threat, such as an employee, or an external threat such as a hacker.

Typically, a hypervisor may serve as a container or virtual environment for one or more virtual machines. Conventionally, a virtual machine may interact with resources in a hypervisor and the virtual machine may be unaware that it is not a physical machine. Generally, a hypervisor may provide resources to a virtual machine. Usually, the hypervisor translates physical resources, such as LUNs and processing power, into resources able to be used by a virtual machine. Conventionally, a hypervisor stores one or more virtual machines disks together in a virtual machine file system on physical storage or on a LUN. Usually, a virtual machine file system may appear as a single file to processes outside the hypervisor. Generally, a virtual machine may be created and deleted in virtualized environments. Typically, some virtual machines are long lived while others exist for short periods of time and are created for specific tasks. In certain embodiments herein, the application may refer to suspicious activity. In many embodiments, suspicious activity may indicate activity that is outside of the ordinary and may indicate a hacker or other data breach.

In certain embodiments as used herein, reference may be made to a storage layer. In most embodiments, a storage layer may be outside of and not visible to a virtual machine inside a hypervisor. In many embodiments, a hypervisor layer may provide a layer of abstraction that abstracts away the physical storage or logical storage that exists outside of the hypervisor. In almost all embodiments, a virtual machine may be ignorant of and unable to examine the storage layer outside of the hypervisor.

In most embodiments, if someone has access to a virtual infrastructure, then generally that person may be able to cause significant damage to that environment. In many embodiments, if an attacker destroyed a virtual machine that the attacker was using, then there may be no record of the content of the virtual machine. In certain embodiments, if an attacker had access to a virtual infrastructure, the attacker may be able to delete logs and mask or remove evidence of the existence of any created virtual machines.

In some embodiments, an indication of data associated with a destroyed virtual machine may be auditing logs of a hypervisor which may include creation and deletion time of the VM. Typical backup technologies may not be good enough to trace what a destroyed virtual machine did as a VM may be created and deleted within a backup window, leaving little to no trace of the VM when a back-up occurs. Usually, if a back-up window is every day, then a user may only know what VMs existed at the time of day the back-up was taken. In some embodiments, a user with access to auditing logs of a hypervisor may be able to delete the logs, or the logs may be corrupted in a production environment. In other embodiments, if nothing more than the creation and deletion time of a VM is available, little analysis may be done on that VM.

In some embodiments, replication of one or more LUNs on which VM data is stored may enable access to a VM that has been deleted. In certain embodiments, replication of LUNs containing data storage of a hypervisor may be from a backend storage array using a continuous data protection technology. In most embodiments, replication at a storage array may be outside of and unreachable from within a hypervisor. In many embodiments, a virtual machine within a hypervisor may have no way to detect replication outside of the hypervisor or on a storage array. In certain embodiments, an attacker using a virtual machine may have no knowledge or way to detect that the actions of the virtual machine are being traced in a physical infrastructure.

In some embodiments, a storage layer splitter may create a replica copy of a hypervisor's virtual machine file system containing virtual machines along with a journal enabling any point in time access to the volume containing the virtual machines. In most embodiments, split IO may enable access to any point in time within a given protection window. In many embodiments, split IO may track each IO that occurs in a virtual environment. In certain embodiments, split IO may create a continuous data protection copy of IO written to a production site for later analysis. In some embodiments, split IO may create a continuous data protection copy of IO written to a replication site for later analysis. In many embodiments, a system may periodically access a point in time using split IO. In certain embodiments, an accessed pointed in time may be used to mount a VMFS to a replication appliance. In most embodiments, a mounted VMFS may be analyzed to determine information about a virtual environment. In some embodiments, information about a virtual environment may include how many virtual machines are present and what files the virtual machines are accessing.

In at least some embodiments, a replication appliance may parse a VMFS. In some embodiments, a replication appliance may create a database of currently available VMs at a given point in time. In certain embodiments, a replication appliance may mount a VMDK at a point in time and add a list of files within the VMDKs to a database. In many embodiments, a database may include auditing information such as who or what process created the VMs. In most embodiments, using continuous data protection, any point in time within a given time frame may be accessed, which may enable access to any virtual machine created or destroyed within that time window. In almost all embodiments, access to a virtual machine within a protection window may enable analysis of the activities of that virtual machine within the protection window.

In further embodiments, if suspicious activity is discovered, a database may be searched and a suspicious virtual machine may be restored. In some embodiments, an analytics engine may run on a database of virtual machines to look for suspicious activities. In certain embodiments, creation or deletion of one or more VMs too often may denote a suspicious activity. In other embodiments, a given file name or file content may denote a suspicious activity.

In most embodiments, when replication is performed on a backend storage array, a person without access to the storage array may not be able to corrupt or hide data on that storage array, even if that person or process has full access to a virtualization and hypervisor layer. In many embodiments, processing may be performed at a replica appliance at replica storage and the processing may not interfere with or be noticeable by virtual machines running in production environment. In many embodiments, continuous data protection (CDP) monitoring may enable tracking activities of a suspicious virtual machine and recover the virtual machine to any point in time. In many embodiments, being able to recover changes in a virtual machine may lead to information about a breach.

The following may be helpful in understanding the specification and claims:

BACKUP SITE—may be a facility where replicated production site data is stored; the backup site may be located in a remote site or at the same location as the production site; a backup site may be a virtual or physical site; a backup site may be referred to alternatively as a replica site or a replication site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA.

HOST—may be at least one computer or networks of computers that runs at least one data processing application that issues I/O requests to one or more storage systems; a host is an initiator with a SAN; a host may be a virtual machine HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more virtual disks or virtual LUNs, which may correspond to one or more Virtual Machines. As used herein, LUN and LU may be used interchangeably to refer to a LU.

Management and deployment tools—may provide the means to deploy, control and manage the RP solution through the virtual environment management tools PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system; may be a virtual or physical site.

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side; may be a virtual or physical site SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side; may be a virtual or physical site WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines. May be referred to herein as an Open Replicator Splitter (ORS).

VIRTUAL VOLUME: may be a volume which is exposed to host by a virtualization layer, the virtual volume may be spanned across more than one site and or volumes VASA: may be a set of vCenter providers that allow an administrator to manage storage VMFS: may be a virtual machine file system, a file system provided by VMware for storing a virtual machine VMDK: may be a virtual machine disk file containing a disk data in a VMFS. Analog to a LUN in a block storage array. In some embodiments a VMDK may have a file system. In certain embodiments, the file system may be NTFS. In other embodiments, the file system may be FAT. In further embodiments the file system may be FAT32. In still further embodiments, the file system may be ext4.

Virtual RPA (vRPA)/Virtual DPA (vDPA): may be a DPA running in a VM.

VASA may be vSphere Storage application program interfaces (APIs) for Storage Awareness.

MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, and METHODS AND APPARATUS FOR OPTIMAL JOURNALING FOR CONTINUOUS DATA REPLICATION and with U.S. Pat. No. 8,332,687, which are hereby incorporated by reference. A description of synchronous and asynchronous replication may be described in the patent titled DYNAMICALLY SWITCHING BETWEEN SYNCHRONOUS AND ASYNCHRONOUS REPLICATION and with U.S. Pat. No. 8,341,115, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal".

Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
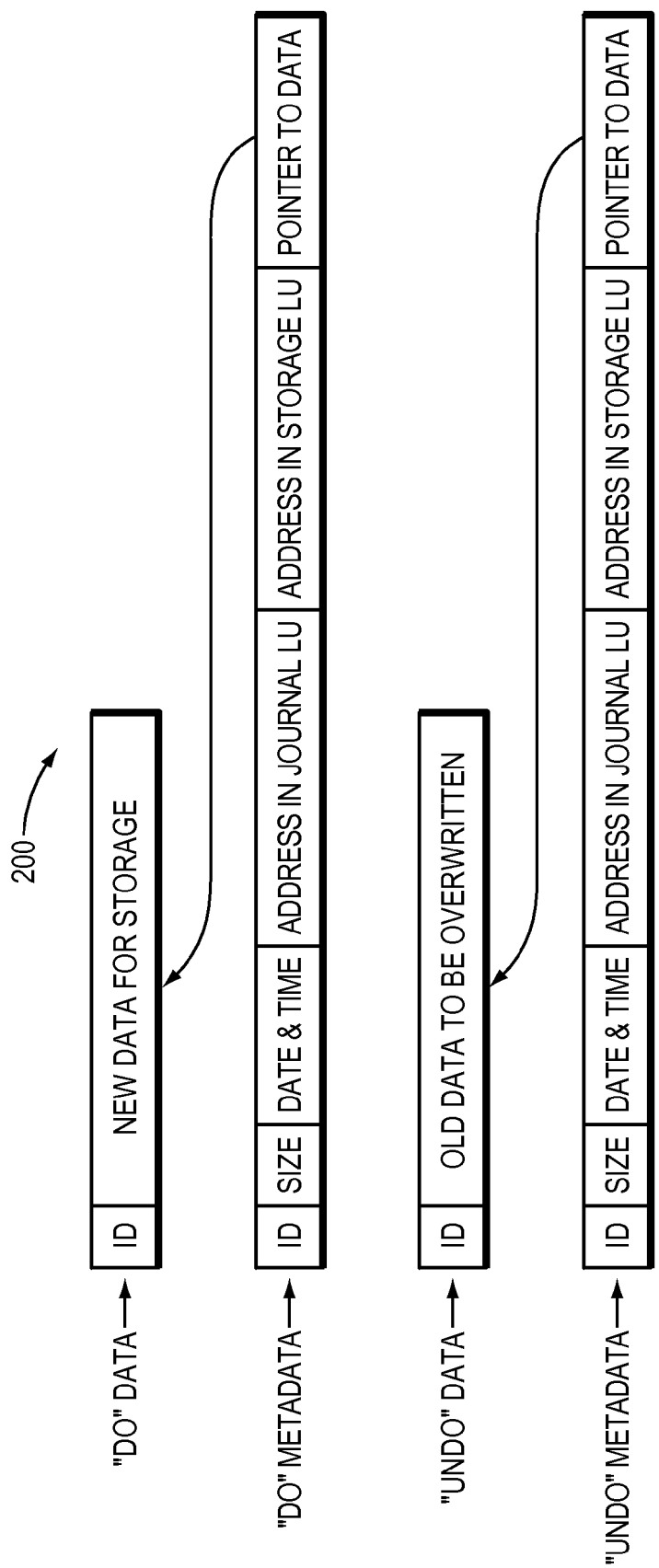
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Read/Write Replication

Figure 3:
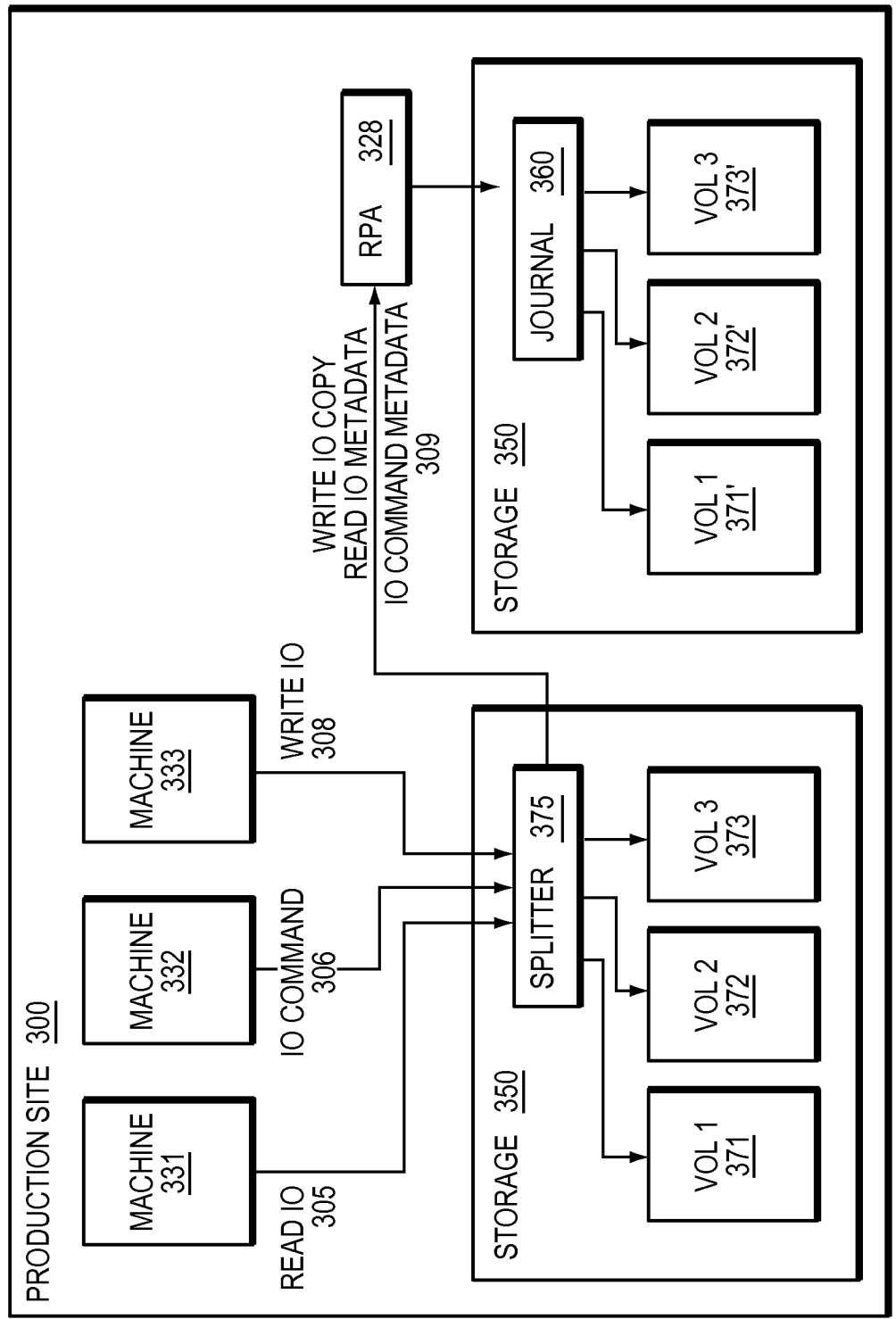
FIG. 3 is a simplified illustration of a replication of read IO metadata, write IO, and IO command metadata, in accordance with an embodiment of the present disclosure.

Refer now to the example embodiment of FIG. 3, which illustrates replicating IO. In the example embodiment of FIG. 3, Production Site 300 has Machine 331, Machine 332, and Machine 333. Machine 331 sends Read IO 305 to storage 350. Machine 332 sends IO command 332 to storage 350. Machine 333 sends Write IO 308 to Storage 350.

Storage 350 has splitter 375 and Volume 1 371, Volume 2 372, and Volume 3 373. Read IO 305, IO command 306, and Write IO 308 are intercepted at splitter 375. Refer now as well to FIG. 4 A. Splitter 375 receives Read IO 305 (step 400). Splitter 375 determines if Read IO 305 is a write IO (step 410). Read IO 305 is not a write IO so Splitter 375 determines if Read IO 305 is a read IO (step 420). As Read IO 305 is a read IO, Splitter 375 replicates the metadata of Read IO 305 to RPA 328 (step 425). Splitter 375 receives IO command 306 (step 400). Splitter 375 determines if IO command 306 is a write IO (step 410). IO command 306 is not a write IO so Splitter 375 determines if IO command 306 is a read IO (step 420), where an IO command may be xcopy command or write same command or another command. As IO command 306 is not a read IO, Splitter 375 determines if IO command 306 is an IO command (step 430). Splitter 375 replicates the metadata of IO command 306 to RPA 328 (step 435). Splitter 375 receives Write IO 308 (step 400). Splitter 375 determines if receives Write IO 308 is a write IO (step 410). As receives Write IO 308 is a write IO, Splitter 375 replicates Write IO 308 to RPA 328 (step 415).

Figure 4B:
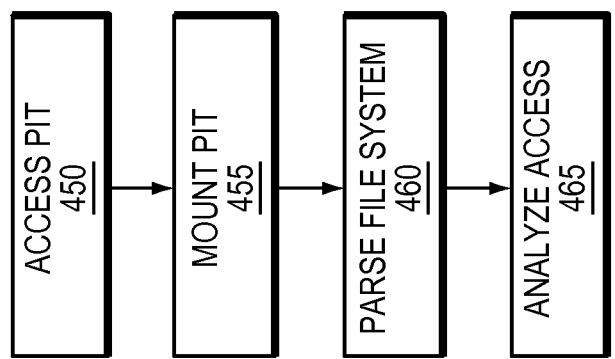
FIG. 4b is a simplified example of a method accessing a point in time, in accordance with an embodiment of the present disclosure.
Figure 4A:
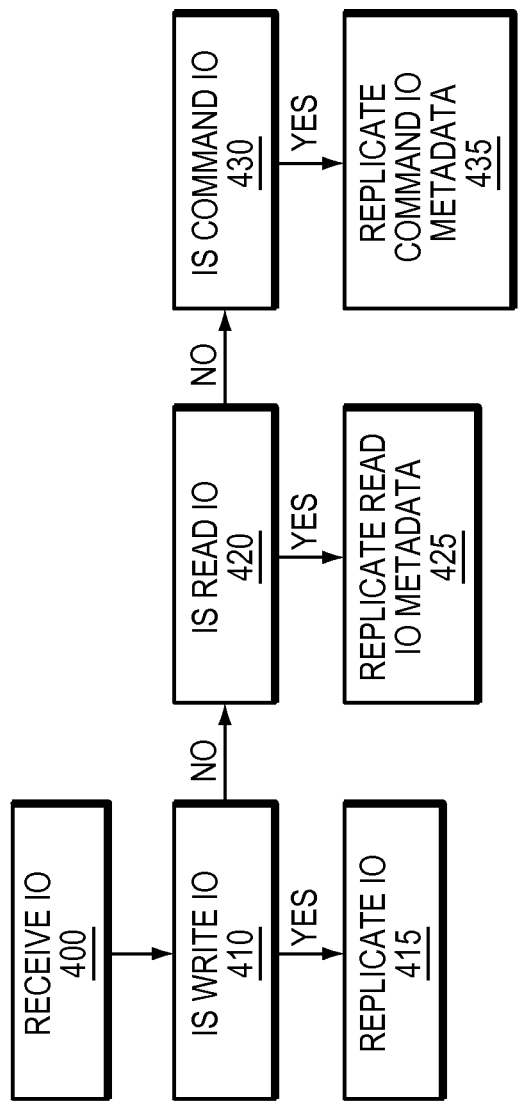
FIG. 4a is a simplified example of a method of replicating IO, in accordance with an embodiment of the present disclosure.
Figure 5:
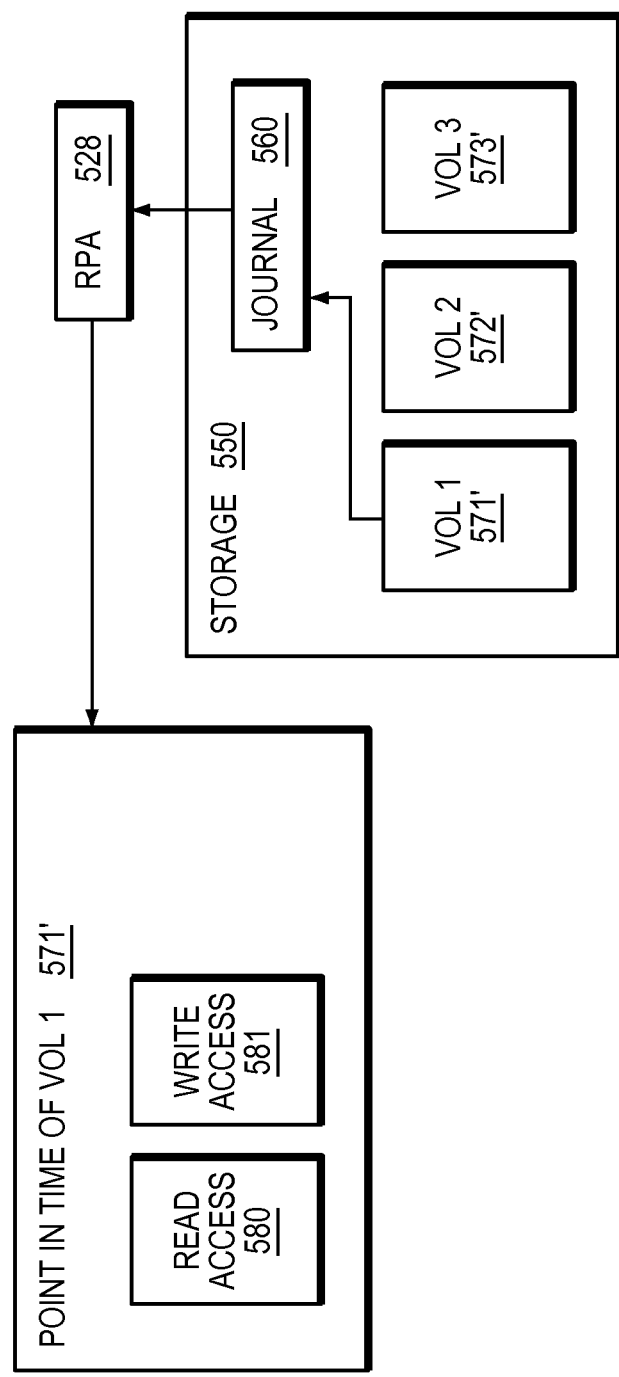
FIG. 5 is a simplified illustration of accessing a point in time with read and write IO data, in accordance with an embodiment of the present disclosure.

Refer now to the example embodiments of FIGS. 4b and 5. Point in time 571 is accessed (step 450). Point in time 571 is mounted (step 455). The file system on point in time is parsed (step 460). Point in time 571 is analyzed (step 465). As noted in FIG. 5, PIT 571 has read access 580 and write access 581 denoting the read and write access to point in time 571.

Figure 6:
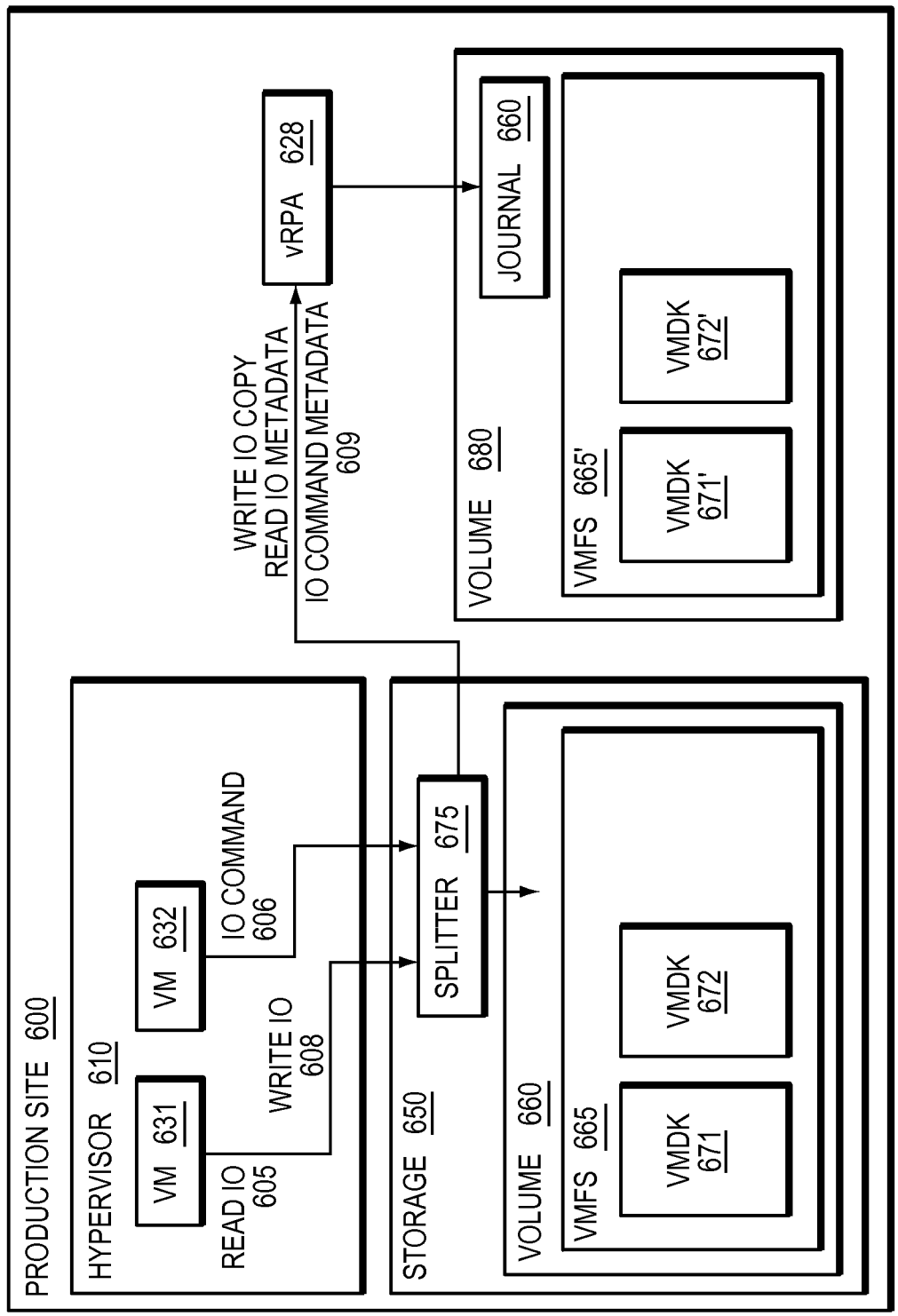
FIG. 6 is a simplified illustration of a replication of read IO metadata, write IO, and IO command metadata being replicated in a hypervisor with the IO being split at a storage layer, in accordance with an embodiment of the present disclosure.

Refer now to the example embodiment of FIG. 6, which illustrates a splitter integrated into a storage. In FIG. 6, production site 600 has hypervisor 610. Hypervisor 610 has VM 631 and VM 632. VM 631 sends IO 605 to VMDK 671, which is in VMFS 665, stored on volume 660 on storage array 650. In this embodiment, IO 605 is intercepted by splitter 675 before being sent to volume 660 respectively. In this embodiment, Hypervisor 610 abstracts storage 650 and volume 660 from VMs 631 and 632 by presenting each VM with an associated virtual machine disk. VMS 631 and 632 have no knowledge of storage 650 splitter 675 or volume 660, rather are aware of their respective VMDKs. In this embodiment hypervisor 610 has no knowledge of splitter 675. In most embodiments, as a storage based splitter may spit IOs at a storage level, a hypervisor may not be able to tamper with IOs in a storage array with the splitter. In almost all embodiments, a storage based splitter may not have knowledge of virtual machines in a hypervisor, even if the hypervisor is tampered with to try and hide activities of or existence of one or more virtual machines. In many embodiments, the intercepted IO may be a read IO, a write IO, or an IO command. In the embodiment of FIG. 6, it may be necessary to parse the VMDKS find the information in the VMDK.

Figure 7B:
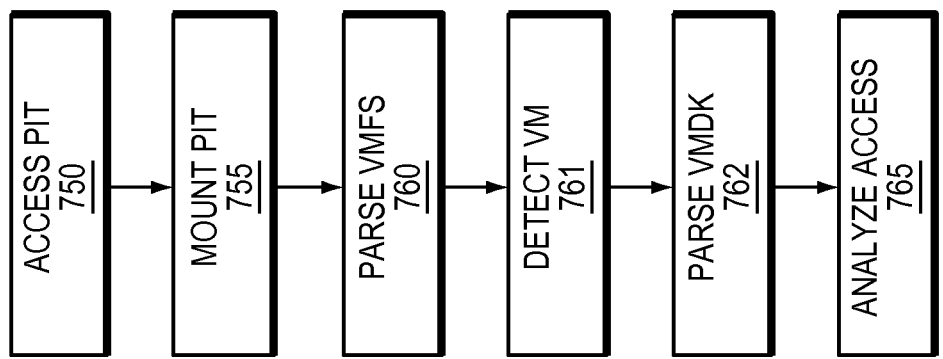
FIG. 7b is a simplified example of a method accessing a point in time, in accordance with an embodiment of the present disclosure.
Figure 7A:
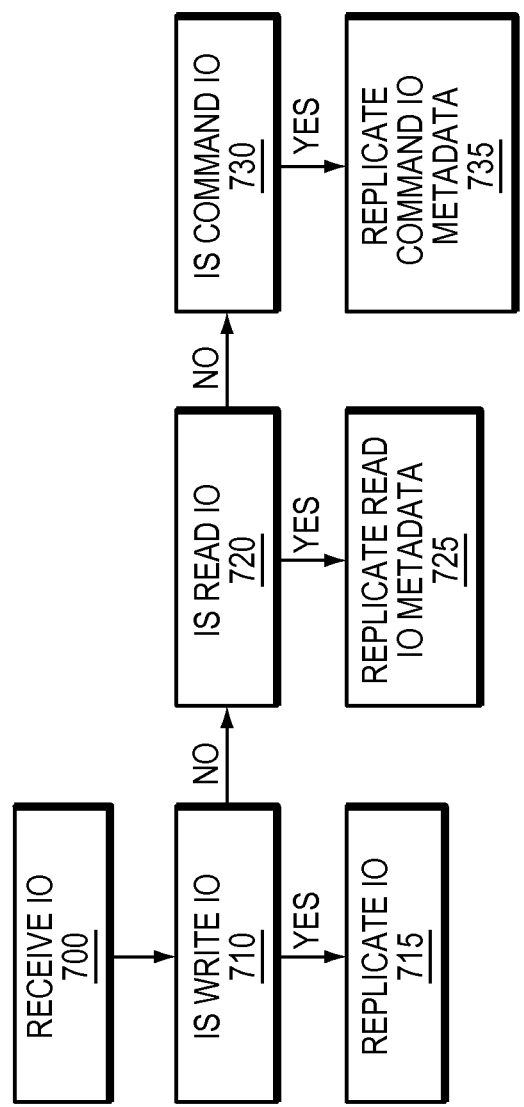
FIG. 7a is an alternative simplified example of a method of replicating IO, in accordance with an embodiment of the present disclosure.

Refer now as well to the example embodiments of FIG. 7*a*. Splitter 675 receives Read 10 605 (step 700). Splitter 675 determines if Read 10 605 is a write IO (step 710). Read 10605 is not a write IO so Splitter 675 determines if Read 10605 is a read IO (step 720). As Read IO 605 is a read IO, Splitter 675 replicates the metadata of Read 10 605 to RPA 628 (step 722). Splitter 675 receives IO command 606 (step 700). Splitter 675 determines if IO command 606 is a write IO (step 710). Read IO 605 is not a write IO so Splitter 675 determines if IO command 606 is a read IO (step 720). As IO command 606 is not a read IO, Splitter 675 determines if IO command 606 is an IO command (step 730). Splitter 675 replicates the metadata of IO command 606 to RPA 328 (step 735). Splitter 675 receives Write IO 608 (step 700). Splitter 675 determines if 20 receive Write IO 608 is a write IO (step 710). As received Write IO 608 is a write IO, Splitter 675 replicates Write IO 608 to RPA 628 (step 715).

Figure 8:
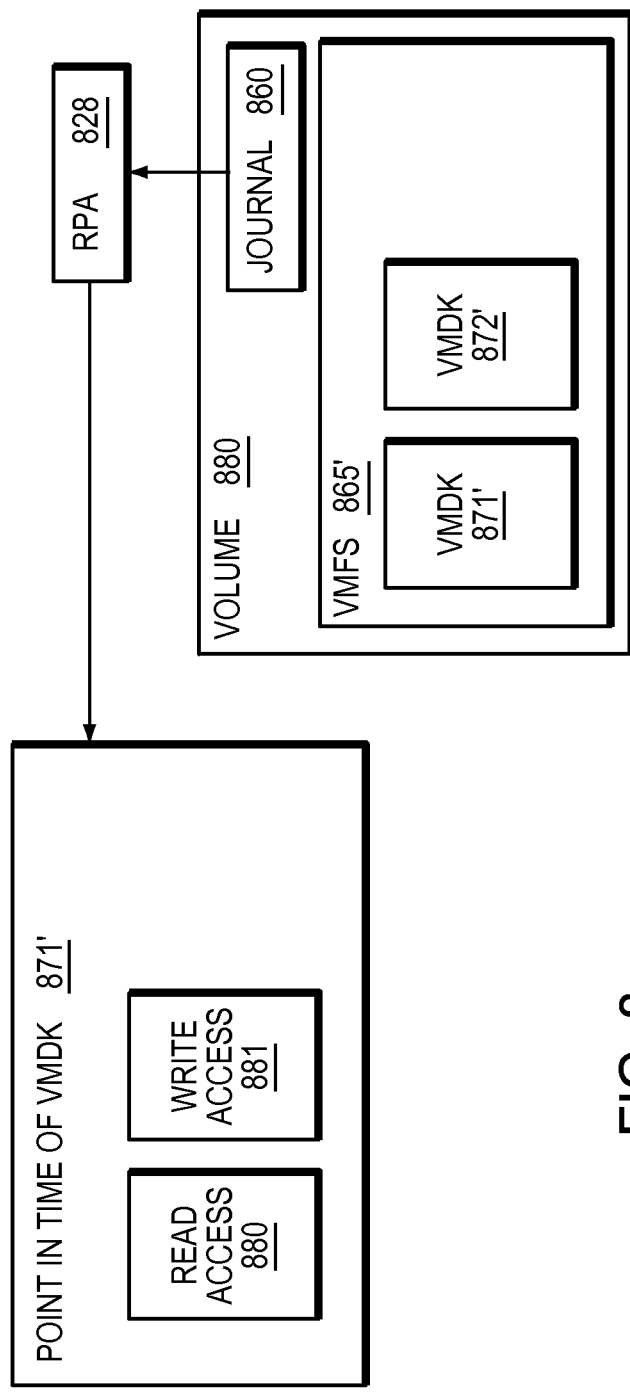
FIG. 8 is a simplified illustration of accessing a point in time with read and write IO data for a virtual machine, in accordance with an embodiment of the present disclosure.

Refer now to the example embodiments of FIGS. 7*b* and 8. Point in time 871 is accessed (step 750). Point in time 871 is mounted (step 755). The VMFS on point in time is parsed (step 760). A virtual machine is detected (step 761) VMDK 871 is parsed (step 762). Point in time 871 is analyzed (step 765). As noted in FIG. 5, PIT 871 has read access 880 and write access 881 denoting the read and write access to point in time 871.

In other embodiments, a splitter may be located in a hypervisor. In an embodiment where a splitter is located in a hypervisor, it may not be necessary to parse the VMFS level, as the IOs are intercepted at the virtual disk (VMDK) level. In certain embodiments, if IOs are intercepted at a hypervisor it may be possible to intercept IOs to a virtual disk, which may enable a point in time to be examined without having to perform parsing.

In certain embodiments, database information about virtual machines may include the number of virtual machines. In other embodiments, database information may include information about files stored on virtual machines. In further embodiments, database information may include information about what actions virtual machines are performing, for example the IO activity of the VM as deduced from IO in the journal may be stored in the database. In many embodiments, the files accessed and the actions performed may be recorded in the database.

Figure 9:
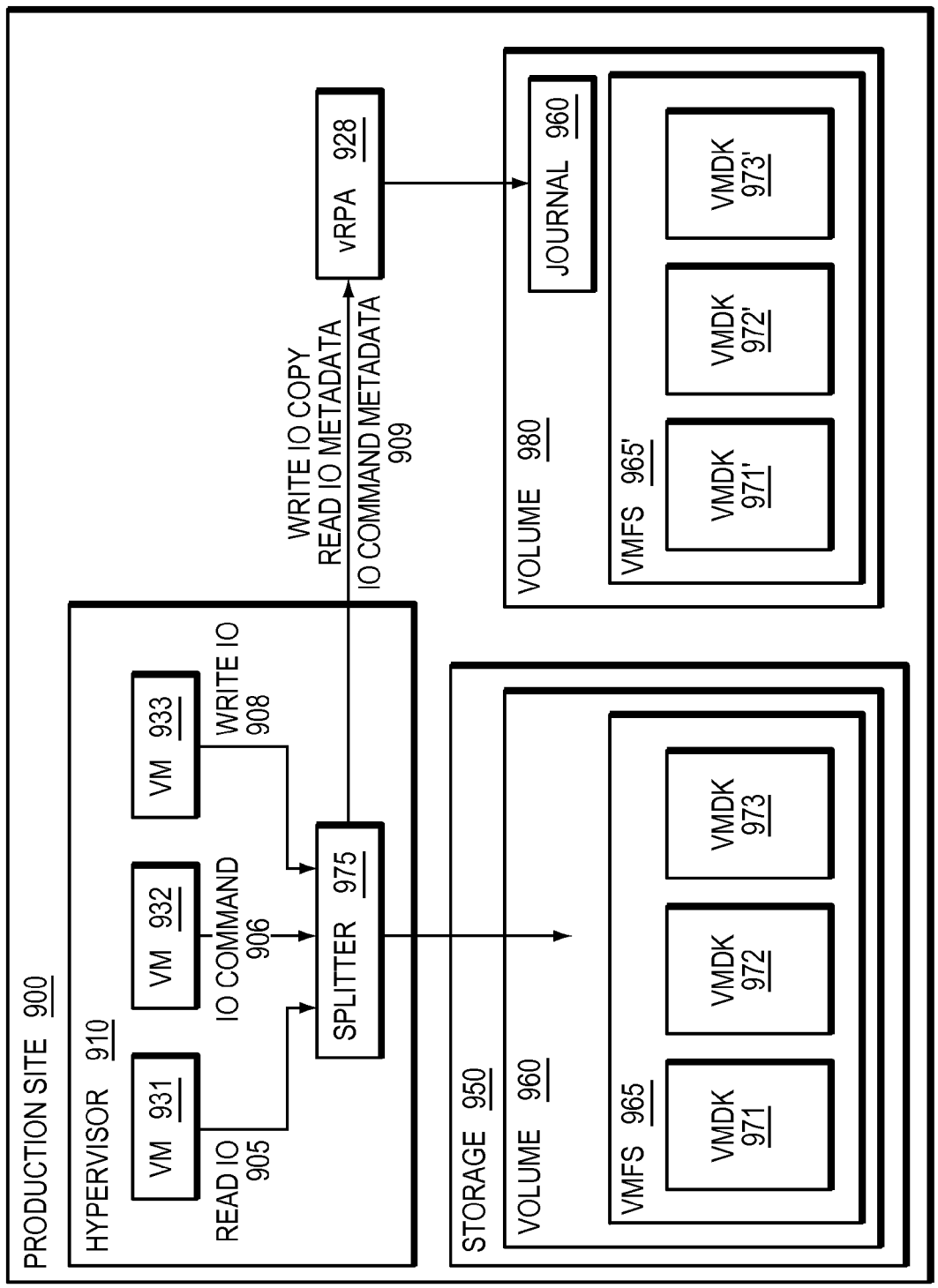
FIG. 9 is a simplified illustration of a replication of read IO metadata, write IO, and IO command metadata being replicated in a hypervisor with the IO being split in the hypervisor, in accordance with an embodiment of the present disclosure.

Refer now to the example embodiment of FIG. 9, which illustrates a splitter integrated into a hypervisor. In FIG. 9, production site 900 has hypervisor 910. Hypervisor 910 has VM 931, VM 932, VM 933, and splitter 975. VM 931 sends Read IO 905 to VMDK 971, which is in VMFS 965, stored on volume 960 on storage array 950. VM 932 sends IO Command 906 to VMDK 972, which is in VMFS 965, stored on volume 960 on storage array 950. VM 933 sends write IO 908 to VMDK 973, which is in VMFS 965, stored on volume 960 on storage array 950.

In this embodiment, IOs 905, 906 and 908 are intercepted by splitter 975 before they are sent to storage 950. In FIG. 8, as replication is performed at the hypervisor level, each virtual machine is enabled to be replicated at the VMDK level.

Figure 10B:
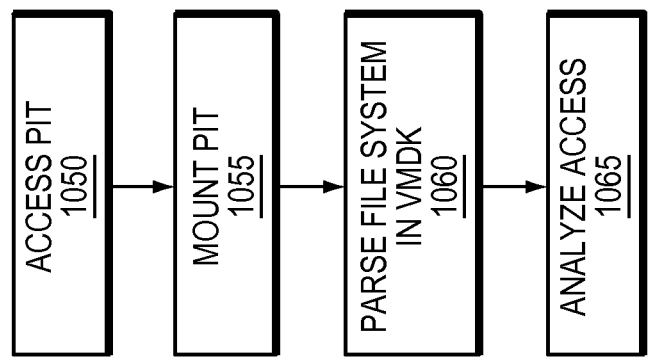
FIG. 10b is a simplified example of a method accessing a point in time, in accordance with an embodiment of the present disclosure.
Figure 10A:
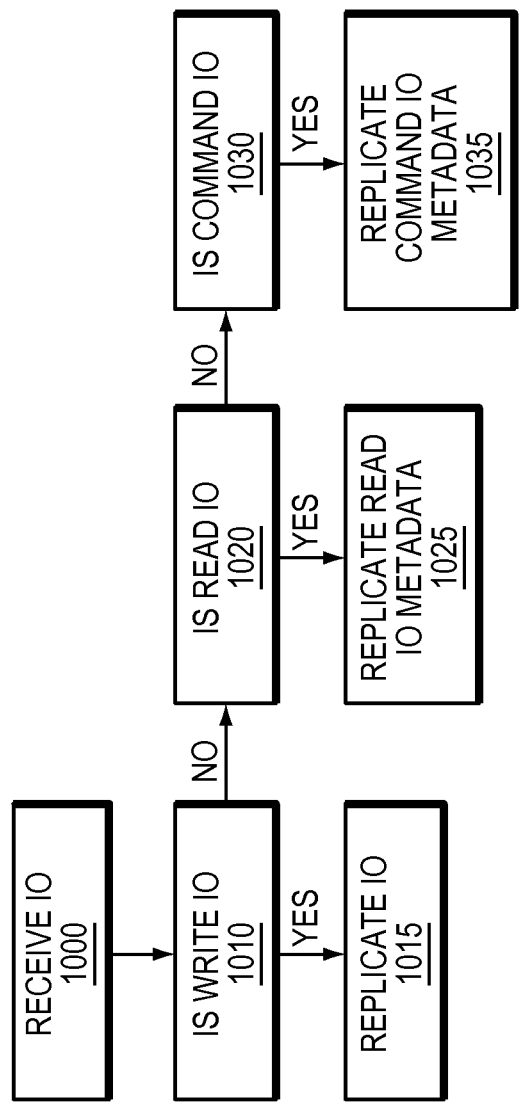
FIG. 10a is an alternative simplified example of a method of replicating IO, in accordance with an embodiment of the present disclosure.

Refer now as well to the example embodiment of FIG. 10*a*. Splitter 975 receives Read IO 905 (step 1000). Splitter 975 determines if Read IO 905 is a write IO (step 1010). Read IO 905 is not a write IO so Splitter 975 determines if Read IO 905 is a read IO (step 1020). As Read IO 905 is a read IO, Splitter 975 replicates the metadata of Read IO 905 to RPA 928 (step 1025). Splitter 975 receives IO command 906 (step 1000). Splitter 975 determines if IO command 906 is a write IO (step 1010). Read 109 is not a write IO so Splitter 975 determines if IO command 606 is a read IO (step 1020). As IO command 906 is not a read IO, Splitter 975 determines if IO command 606 is an IO command (step 1030). Splitter 975 replicates the metadata of IO command 906 to RPA 328 (step 1035). Splitter 975 receives Write IO 908 (step 1000). Splitter 975 determines if receives Write IO 908 is a write IO (step 1010). As receives Write IO 908 is a write IO, Splitter 975 replicates Write IO 908 to RPA 928 (step 1015).

Figure 11:
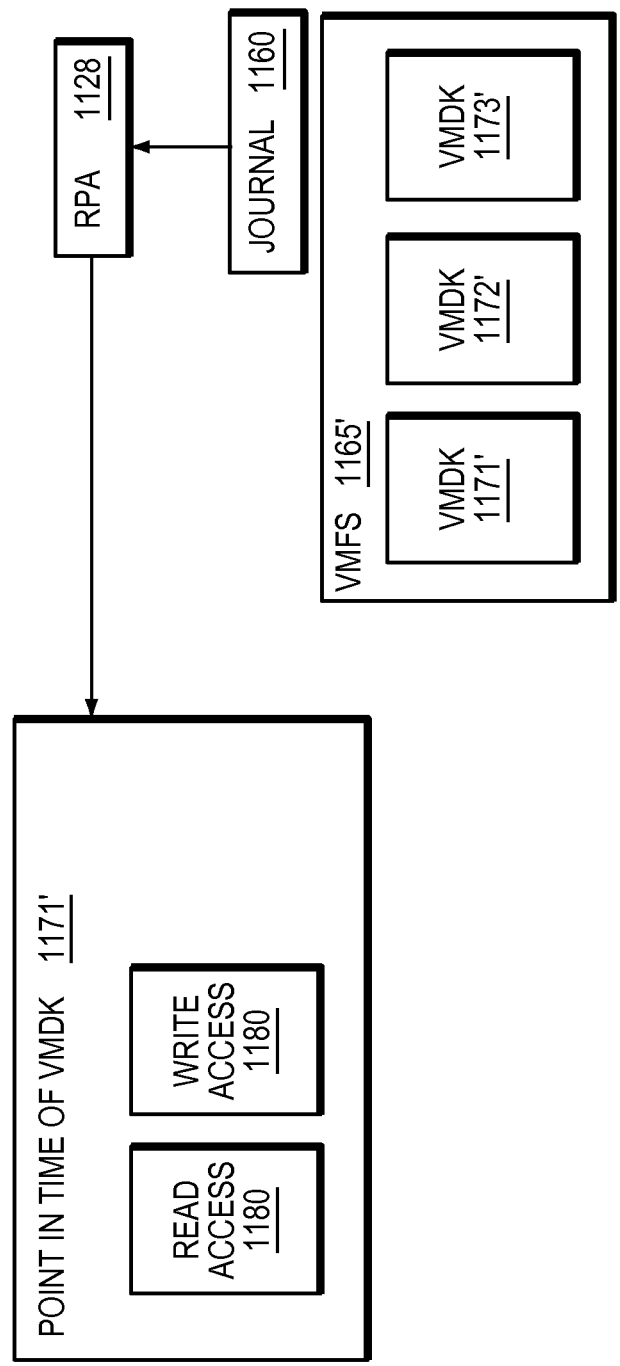
FIG. 11 is an alternative simplified illustration of accessing a point in time with read and write IO data for a virtual machine, in accordance with an embodiment of the present disclosure.

Refer now to the example embodiments of FIGS. 10*b* and 11. Point in time 1171 is accessed (step 1050). Point in time 1171 is mounted (step 1055). File system in VMDK is parsed (step 1060) Point in time 1171 is analyzed (step 1065). As noted in FIG. 5, PIT 1071 has read access 1180 and write access 1181 denoting the read and write access to point in time 1171.

In some embodiments, an outside trigger may cause a point in time to be mounted and analyzed. In other embodiments, information about read and write access may be stored in a database. In certain embodiments, an RPA may periodically mount a point in time to update a database describing machines being replicated. In other embodiments, an RPA may be set to mount a point in time in response to an event detected by a splitter. In further embodiments, an event that may cause a point in time to be mounted to update a database may be creation of a virtual machine. In most embodiments, a database may contain a listing of machines and other information about the machines such as files accessed and processes started. In some embodiments, a database may contain a configuration of each machine. In certain embodiments, a database may contain changes to machine configurations. In some embodiments, a database may contain the operating system of the machine. In at least some embodiments, a database may contain an activity metric of the machines. In at least one embodiment, a database may contain IO memory activity.

In many embodiments, a database recording machine activity may be regularly analyzed. In most embodiments, suspicious activity may be found by analyzing activity found in a machine database. In certain embodiments, where a database is updated each time a virtual machine is created or deleted, the database may catalog each virtual machine that existed in a hypervisor in a given period of time. In certain embodiments, a database may capture suspicious activity of short lived virtual machines. In some embodiments, use of a high amount of storage may trigger one or more entries in a database. In other embodiments, high use of network resources may trigger one or more entries in a database. In other embodiments, different events or actions may trigger one or more entries in a database. In a particular embodiment, leak prevention software may trigger one or more entries in a database. In most embodiments, suspicious activity may be found by analyzing a database.

In certain embodiments, once a virtual machine is suspected of suspicious activity, the virtual machine may be restored by returning the replica volume to the timestamp when the virtual machine existed. In other embodiments, if a machine is suspected of suspicious activity at a point in time, that point in time may be restored and analyzed. In most embodiments, a restored point in time of a machine may be analyzed to see what data the machine had and what actions it performed. In further embodiments, a suspicious time period may be identified and points in time for these machines within the suspicious time period may be restored an analyzed. In further embodiments, a suspicious time period may be identified by an external tool.

In some embodiments, a system may detect suspicious activities by mounting a file system looking for new files and detecting new file data is encrypted.

In many embodiments, files that have been accessed may be detected. In certain embodiments, accessed files may be detected by parsing a file system. In some embodiments, a file system may be on a virtual disk and the virtual machine disk and or the virtual machine file system storing the virtual machine disk may need to be parsed to determine what files have been accessed. In most embodiments, by parsing a file system it may be able to determine addresses on the disk corresponding to where each file is stored. In certain embodiments, a database may hold mapping from files to blocks on which the files reside. In most embodiments, using a parsed file system metadata of reads may indicate the list of reads that occurred during the period, which may indicate which files where accessed. In most embodiments, a system may detect which files were read, and from the files that were read, it may be possible to indicate which files were read from the beginning to the end. In many embodiments, if a whole file was read, it may indicate a strong suspicion that the file was stolen. In certain embodiments, based on files that are suspected as stolen and based on the file type and content, the system IO may filter important files (like does) and thus create a list of suspected stolen files. In further embodiments, by comparing read metadata with write metadata and or command metadata, it may be possible to determine commands performed on the read data.

Figure 12:
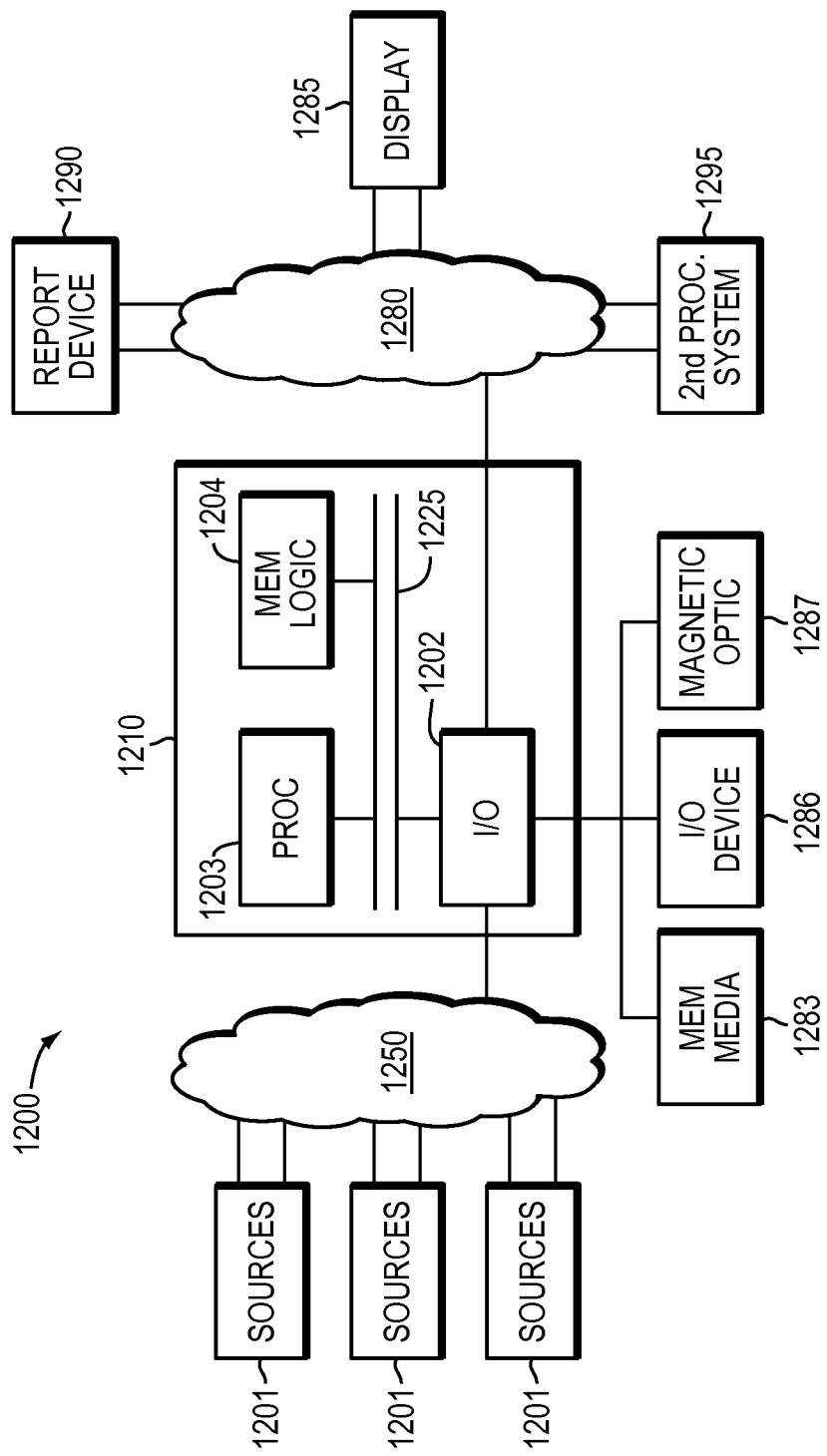
FIG. 12 an example of an embodiment of an apparatus that may utilize the techniques described herein, in accordance with an embodiment of the present disclosure.
Figure 13:
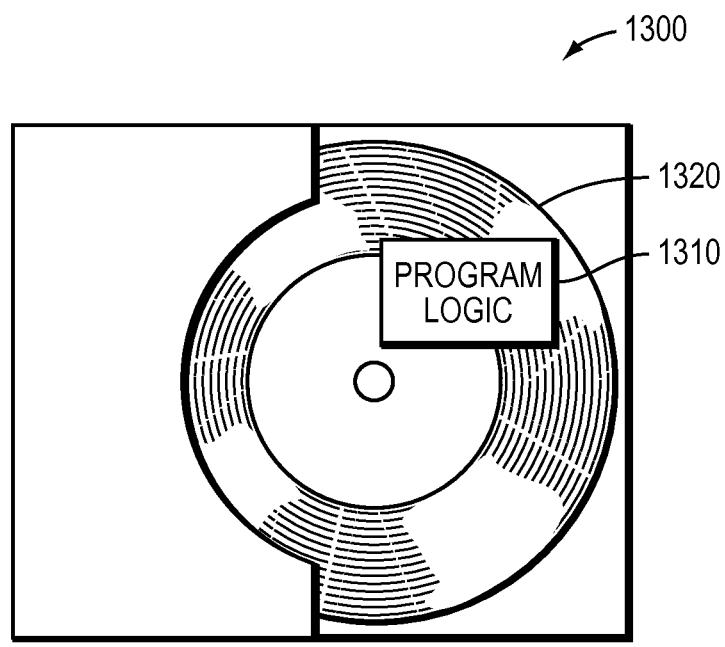
FIG. 13 is an example of an embodiment of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 12, the machine becomes an apparatus for practicing the invention. When implemented on one or more general-purpose processors, the program code combines with such a processor 1203 to provide a unique apparatus that operates analogously to specific logic circuits. As such a general purpose digital machine can be transformed into a special purpose digital machine. FIG. 13 shows Program Logic 1310 embodied on a computer-readable medium 1320 as shown, and wherein the Logic is encoded in computer-executable code configured for carrying out the reservation service process of this invention and thereby forming a Computer Program Product 1300. The logic 1310 may be the same logic 1240 on memory 1204 loaded on processor 1203. The program logic may also be embodied in software modules, as modules, or as hardware modules.

The logic for carrying out the method may be embodied as part of the system described below, which is useful for carrying out a method described with reference to embodiments shown in, for example, FIGS. 4, 7, and 10. For purposes of illustrating the present invention, the invention is described as embodied in a specific configuration and using special logical arrangements, but one skilled in the art will appreciate that the device is not limited to the specific configuration but rather only by the claims included with this specification. A processor may be a physical or virtual processor.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:
1. A system comprising:
a replication image corresponding to a copy of a production image at a point in time, the production image comprising a copy of a logical storage unit of a storage system at a specific point in time;
a journal comprising copies of input/output (IO) requests to the storage system, the IO requests issued by an entity in communication with the storage system for at least a portion of a protection window, wherein the journal comprises read metadata, write data and write metadata; wherein at least one of the read metadata, write data, and write metadata is configured to convey information relating to at least one virtual machine that existed during at least a portion of the protection window; wherein the write data and write metadata enable the replication image to be rolled to different points in time within the protection window; wherein the write data corresponds to data of writes that occurred to the production image during the protection window, and wherein the read metadata denotes reads that occurred to the production image during the protection window; and
a protection agent configured to intercept, during the protection window, at least a portion of the IO requests to the production image and to replicate to a replication site a copy of the write data, write metadata, and read metadata corresponding to the IO, the replication site comprising the journal and replication image;
computer-executable logic operating in memory, wherein the computer-executable program logic is configured to cause execution across one or more processors of:
rolling the replication image to a first point in time in the protection window by applying the write data using the write metadata, the first point in time corresponding to a time within a first protection window during which the at least one virtual machine existed within the storage system, wherein the replication image is configured to enable access to the at least one virtual machine even if the at least one virtual machine has been deleted;
examining at least a portion of at least one of the read metadata, write data, and write metadata to deter- mine if any suspicious activity relating to the production image occurred when the at least one virtual machine existed; and generating, based on a positive determination, a user notification relating to at least one file suspected of being associated with the suspicious activity.

2. The system of claim 1 wherein the examining comprises determining at least one action taken by the at least one virtual machine during a period of time following the first point in time to which the replication image was rolled.

3. The system of claim 1 wherein the examining further comprises determining whether a file suspected of being associated with the suspicious activity was encrypted.

4. The system of claim 1 wherein the computer-executable program logic is configured to cause execution across one or more processors of determining what files on the production image were accessed, parsing a file system on the replication image for files and mapping read metadata to the files.

5. The system of claim 1 wherein the examining further comprises determining if a file of the production image was read from beginning to end by examining the read metadata.

6. The system of claim 1 wherein a list of files suspected to be stolen is created based at least in part on a determination of whether files on the production image were determined to have been read.

7. The system of claim 1, wherein rolling the replication image to a first point in time further comprises restoring the at least one virtual machine that existed during the point in time.

8. The system of claim 1, wherein the protection agent is configured to:

create a replica copy of a virtual machine file system (VMFS) containing the at least one virtual machine; and replicate in the journal information sufficient to enable access to any point in time in a volume containing the at least one virtual machine, wherein the replica copy of the VMFS virtual machine file system is configured to enable access to the at least one virtual machine even if the at least one virtual machine has been deleted.

9. A computer implemented method comprising:

accessing a replication image corresponding to a copy of a production image at a specific point in time, the production image comprising a copy of a logical storage unit of a storage system at the specific point in time;

intercepting, during a protection window that encompasses the specific point in time, at least a portion of input/output (IO) requests to the production image from an entity in communication with the storage system for at least a portion of the protected window and replicating to a replication site a copy of write data, write metadata, and read metadata corresponding to the IO, the replication site comprising a journal and the replication image;

replicating to the journal at least a portion of information associated with the intercepted IO requests, the at least a portion of information comprising at least read metadata, write data, and write metadata, wherein at least on of the read metadata, write data, and write metadata is configured to convey information relating to at least one virtual machine that existed during at least a portion of the protection window, wherein the write data and write metadata enable the replication image to be rolled to different points in time within the protection window, wherein the write data corresponds to data of writes that occurred to the production image during the protection window, and wherein the read metadata denotes reads that occurred to the production image during the protection window;

rolling the replication image to a first point in time in the protection window by applying write data from a journal using write metadata from the journal, the first point in time corresponding to a time within a first protection window during which the at least one virtual machine existed within the storage system, wherein the replication image is configured to enable access to the at least one virtual machine even if the at least one virtual machine has been deleted;

examining at least a portion of at least one of the read metadata, write data, and write metadata to determine if any suspicious activity relating to the production image occurred when the at least one virtual machine existed; and generating, based on a positive determination, a user notification relating to at least one file suspected of being associated with the suspicious activity.

10. The method of claim 9 wherein the examining comprises determining at least one action taken by the at least one virtual machine during a period of time following the first point in time to which the image was rolled.

11. The method of claim 9 wherein the examining further comprises determining whether a file suspected of being associated with the suspicious activity was encrypted.

12. The method of claim 9 further comprising determining what files on the production image were accessed, parsing a file system on the replication image for files and mapping read metadata to the files.

13. The method of claim 9 wherein the examining further comprises determining if a file of the production image was read from beginning to end by examining the read metadata.

14. The method of claim 9 further comprising creating a list of files suspected to be stolen based at least in part on a determination of whether files on the production image were determined to have been read.

15. A computer program product comprising:

a non-transitory computer readable medium encoded with computer executable program code, wherein the code enables execution across one or more processors of:

accessing a replication image corresponding to a copy of a production image at a specific point in time, the production image comprising a copy of a logical storage unit of a storage system at the specific point in time;

intercepting, during a protection window that encompasses the specific point in time, at least a portion of input/output (IO) requests to the production image from an entity in communication with the storage system for at least a portion of the protected window and replicating to a replication site a copy of write data, write metadata, and read metadata corresponding to the IO, the replication site comprising a journal and the replication image;

replicating to the journal at least a portion of information associated with the intercepted IO requests, the at least a portion of information comprising at least read metadata, write data, and write metadata, wherein at least one of the read metadata, write data, and write metadata is configured to convey information relating to at least one virtual machine that existed during at least a portion of the protection window, wherein the write data and write metadata enable the replication image to be rolled to different points in time within the protection window, wherein the write data corresponds to data of writes that occurred to the production image during the protection window, and wherein the read metadata denotes reads that occurred to the production image during the protection window;

rolling the replication image to a first point in time in the protection window by applying write data from a journal using write metadata from the journal, the first point in time corresponding to a time within a first protection window during which the at least one virtual machine existed within the storage system, wherein the replication image is configured to enable access to the at least one virtual machine even if the at least one virtual machine has been deleted;

examining at least a portion of at least one of the read metadata, write data, and write metadata to determine if any suspicious activity relating to the production image occurred when the at least one virtual machine existed; and generating, based on a positive determination, a user notification relating to a least one file suspected of being associated with suspicious activity.

16. The computer program product of claim 15 wherein the examining comprises determining at least one action taken by the at least one virtual machine during a period of time following the first point in time to which the replication image was rolled.

17. The computer program product of claim 15 wherein the examining further comprises determining whether an accessed file on the production image was encrypted.

18. The computer program product of claim 15 wherein the code enables execution across one or more processors of determining what files on the image were accessed, parsing a file system on the image for files and mapping read metadata to the files.

19. The computer program product of claim 15 wherein the code enables execution across one or more processors of determining if a file of the production image was read from beginning to end by examining the read metadata.

20. The computer program product of claim 15 wherein the code enables execution across one or more processors of creating a list of files suspected to be stolen based at least in part on a determination of whether files on the production image were determined to have been read.

* * * * *

UNITED STATES PATENT AND TRADEMARK OFFICE
CERTIFICATE OF CORRECTION

PATENT NO. : 9,917,854 B2  
APPLICATION NO. : 14/870135  
DATED : March 13, 2018  
INVENTOR(S) : Assaf Natanzon et al.

Page 1 of 1

It is certified that error appears in the above-identified patent and that said Letters Patent is hereby corrected as shown below:

In the Specification

Column 3, Line 35 delete "LVN" and replace with --LUN--.

Column 3, Line 36 delete "LVNs" and replace with --LUNs--.

Column 4, Line 2 delete "En" and replace with --In--.

Column 15, Line 10 delete "spit" and replace with --split--.

Column 15, Line 22 delete "10605" and replace with --IO 605--.

Column 15, Line 23 delete "10605" and replace with --IO 605--.

Column 15, Line 24 delete "10605" and replace with --IO 605--.

Column 15, Line 25 delete "10605" and replace with --IO 605--.

Column 16, Line 19 delete "Read 109" and replace with --Read IO 9--.

Column 17, Line 45 delete "does" and replace with --doc--.

Signed and Sealed this  
Twenty-eighth Day of August, 2018

Andrei Iancu  
*Director of the United States Patent and Trademark Office*